L. C. THOMASON.
CULTIVATOR ATTACHMENT.
APPLICATION FILED JULY 30, 1912.
1,060,797.
Patented May 6, 1913.
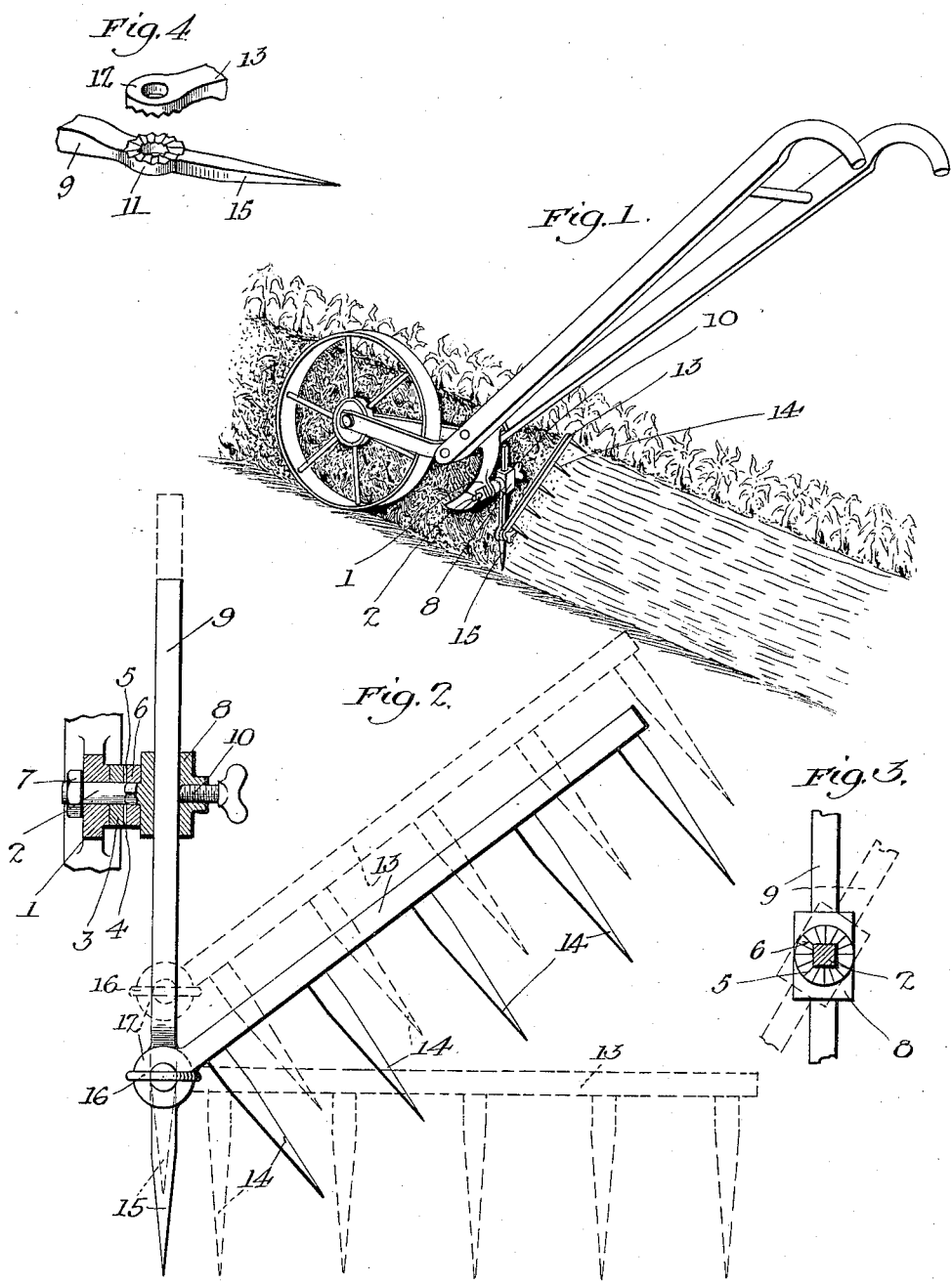

UNITED STATES PATENT OFFICE.

LOUISE C. THOMASON, OF DEL ROSA, CALIFORNIA.

CULTIVATOR ATTACHMENT.

1,060,797.  Specification of Letters Patent.  Patented May 6, 1913.

Application filed July 30, 1912. Serial No. 712,330.

*To all whom it may concern:*

Be it known that I, LOUISE C. THOMASON, a citizen of the United States, residing at Del Rosa, in the county of San Bernardino, State of California, have invented a new and useful Cultivator Attachment, of which the following is a specification.

This invention relates to a device which is adapted to be attached to a hand cultivator, and the object of the invention is to provide an attachment by means of which the ground can be cultivated close to the growing plant.

It is very difficult to cultivate the ground immediately close to the plant for the reason that the leaves of the plant spread out, and the present attachment is so constructed that it can be set at any desired angle and will extend from the cultivator close to the plant and will cultivate the soil between the cultivator and plant as the cultivator is moved along.

Referring to the accompanying drawings—Figure 1 is a perspective view of the device attached to the cultivator showing it in use. Fig. 2 is an enlarged end elevation of the attachment partly in section, the dotted lines showing different positions of the attachment. Fig. 3 is a view looking toward the adjusting clamp in a direction at right angles to the view in Fig. 2. Fig. 4 is a perspective of the adjustable swivel members.

The cultivator herein shown forms no part of the present invention, and the device is capable of attachment to various forms of cultivators.

In the cultivator herein shown a lug 1 is formed to which the attachment is secured. The attachment comprises a bolt 2 which passes through the lug 1, and has a washer 3 with radial serrations 4 which engage with radial serrations 5 formed on an adjoining nut 6. A nut 7, when tightened, draws the serrations 4 and 5 into interlocked engagement.

On the end of the bolt 2 is a sleeve 8 which receives a vertical bar 9 which is adjustably held in position by a thumb screw 10. Near the lower end of the bar 9 is one member 11 of a swivel joint formed with radial serrations which engage similar serrations formed on another member 12 which is on the end of a lateral bar 13. Carried by the bar 13 are cultivating teeth 14 spaced at suitable distances apart, and on the lower end of the bar 9 is a tooth 15.

A thumb screw 16 secures the joint members 11 and 12 adjustably together. By loosening the thumb screw 16 the bar 13 with its teeth may be adjusted into the desired angle according to the pitch of the earth which lies close against the plant and which is to be cultivated, this earth usually lying at an angle to the horizontal on account of being hilled up against the plant. This earth may be horizontal, in which case the bar 13 with its teeth may be adjusted into horizontal position, indicated by dotted lines in Fig. 2. The tooth 15 on the end of the bar 9 acts to scratch the earth at a point in line with the bar 9. The thumb screw 10 may be loosened to adjust the bar 9 vertically, according to the depth it is desired to cultivate.

What I claim is:—

1. A cultivator attachment comprising a lug on the cultivator, a sleeve with a bolt projecting laterally therefrom and revoluble in said lug, a nut on the bolt, a bar vertically adjustable in said sleeve, a lateral bar pivoted to the lower end of said vertical bar and adjustable to various angles with respect to the vertical bar, and cultivating teeth carried by said lateral bar.

2. A cultivator attachment comprising a clamp means adapted to be secured to the cultivator, a bar vertically and angularly adjustable in said clamp means, a lateral bar pivoted to said vertical bar and adjustable to various angles with respect to the vertical bar, cultivating teeth carried by said lateral bar, and a tooth on the lower end of the vertical bar below the joint between the vertical bar and lateral bar.

3. A cultivator attachment comprising a vertical bar, clamp means for angularly and vertically adjustably securing said vertical bar to the cultivator, the vertical bar having a joint member formed with radial serrations, a lateral bar having a joint member formed with radial serrations adapted to interlock with the first mentioned serrations, a bolt through said joint, and teeth projecting down from said lateral bar.

In testimony whereof, I have hereunto set my hand.

LOUISE C. THOMASON.

In presence of—
JOHN THOMASON,
C. A. HUNT.

Copies of this patent may be obtained for five cents each, by addressing the "Commissioner of Patents, Washington, D. C."